Figure 1:
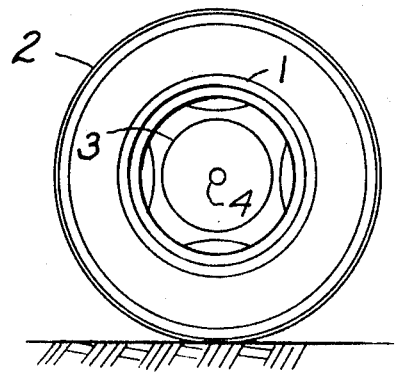

United States Patent

[11] 3,585,962

| [72] | Inventor | Karl O. Vartia |
| | | 5214 Grove Ave., Austin, Tex. 78756 |
| [21] | Appl. No. | 840,903 |
| [22] | Filed | July 11, 1969 |
| [45] | Patented | June 22, 1971 |

[54] WHEEL BALANCE INDICATOR
2 Claims, 4 Drawing Figs.

[52] U.S. Cl. .................................................. 116/114,
73/457, 73/487, 116/28
[51] Int. Cl. ................................................ G01m 1/00
[50] Field of Search .................................... 73/66, 457,
460, 487; 116/114, 28

[56] References Cited
UNITED STATES PATENTS
2,818,830  1/1958  Kester ........................ 116/114

3,289,483  12/1966  Slemmons ..................... 73/459
3,411,074  11/1968  Mayer .......................... 73/66

*Primary Examiner*—James J. Gill
*Assistant Examiner*—Herbert Goldstein

ABSTRACT: The cyclical repetition of an unbalanced accelerative force in a specific direction in an unbalanced rotating vehicle wheel assembly is detected by its displacement of a buoyant float, immersed in a viscous fluid in a transparent container at the axis of rotation, from an equilibrium position at the axis characteristic of a balanced rotating system, the viscosity of the fluid being sufficient to maintain a displaced position of the float while the assembly is brought to a stop, thus giving positive visual indication of unbalance as well as permitting an estimate of the direction and magnitude of the unbalanced force.

PATENTED JUN 22 1971

3,585,962

Karl O. Vartia
INVENTOR.

WHEEL BALANCE INDICATOR

My invention is embodied in a flattened, preferably circular container with at least one translucent or transparent face portion and having contained therein a viscous fluid which in combination with a movable indicator of less density than the fluid substantially fills the container. The indicator may be simply a bubble of air in the viscous fluid. The container is mounted by any suitable means at the axis of rotation of an automobile wheel and at right angles to the axis, with the transparent face portion outward so that the position of the indicator bubble or other float device may be viewed. If the wheel upon which the container is mounted is properly balanced, the so-called centrifugal force of rotation, continued during movement at highway speeds for a reasonable time, floats the indicator bubble to the center of the container. The viscosity of the fluid and the dimensions of the container and indicator are so proportioned that when the vehicle is halted the force of gravity is either insufficient to move the indicator out of the position attained under the action of the centrifugal forces or can only very slowly move it, thus allowing sufficient time for a vehicle operator to get out of his vehicle and observe whether or not the indicator is centered. In the event the wheel is not balanced, whether due to imperfections in the wheel or the tire or both, there is an unbalanced outward acceleration in the direction of the heavy side which at high speeds tends to alternately lift the tire from the road surface as the heavy side is uppermost or to "thump" it into the road as the heavy side is down. The repeated impacts in one direction due to this action gradually force the indicator bubble away from center and the operator, on observing such a condition, knows that the wheel needs attention. Preferably each wheel is equipped with a similar device so that the operator can know whether only one, or more than one, wheel needs attention.

Although the most immediate benefit of the device is thus to narrow the search for the cause of annoying wheel vibrations, it may be used with cut and try methods of adding weights to balance a wheel. It will be found that the indicator float is forced in general toward the light side, but the action of shock absorbers is to delay the road impact from the instant the heavy side is directly below the axis. With shock absorbers in good condition the delay may be as much as 90°.

Figure 2:
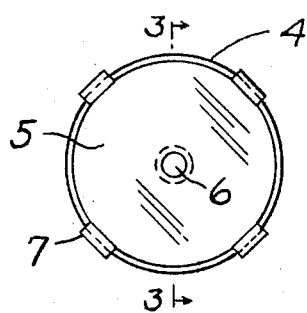
Figure 3:
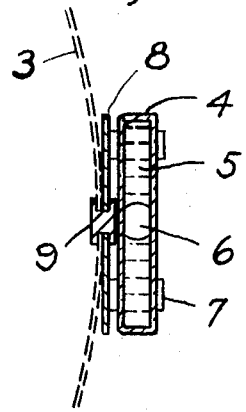
Figure 4:
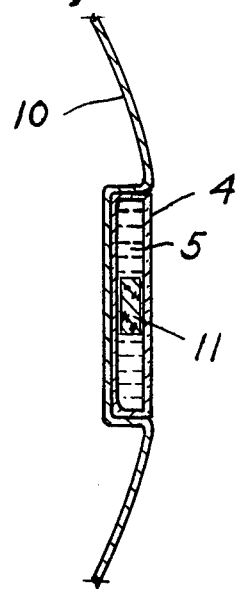

For further description of my invention reference is made to the attached drawings in which FIG. 1 is a general elevation of a conventional wheel assembly with my invention at the center. FIG. 2 is an enlarged elevation of one form of my invention and FIG. 3 is a cross section of FIG. 2. FIG. 4 is a cross section of an alternative arrangement wherein my invention is incorporated in a modification of a convention automobile hubcap or wheel cover, and in which a solid indicator float is used instead of a bubble.

In FIG. 1 number 1 represents the wheel, 2 the tire and 3 a hubcap, to which is attached by any suitable means the circular flat container 4. FIGS. 2 and 3 show an enlarged elevation and cross section, respectively, of container 4 with the viscous filling 5 and air bubble 6, plus the prongs 7 which hold the container to a base plate 8. Plate 8 in turn is attached by fastener 9 to the axial center of the hubcap 3. Obviously it could be similarly attached to a wheel cover. In FIG. 4 the wheel cover or hubcap 10 is shown as having an integral depressed area to accommodate the container 4. Also, instead of having an air bubble as the float in viscous fluid 5, a solid float 11 is shown. With the latter type of float a less viscous fluid may be used since the differential floating force tending to displace the float from its correct indicating position upon halting the vehicle will be less than with air. Also the container and float may be proportioned to have very little clearance between them thus increasing the viscous drag by any desired amount. The fluid and float may be of contrasting colors for easier viewing of float position. In lieu of an air bubble 6 or solid float 11, the float could be a small portion of some fluid of less density than and immiscible with the main fluid filling 5 and of contrasting color.

Undoubtedly numerous other modifications and applications of my invention will occur to those skilled in the art.

I claim:

1. A method of balancing a rotating assembly such as a vehicle wheel which consists of:

providing a closed container having a filling of suitably viscous fluid surrounding a movable indicator of less density than said fluid, said container having a transparent portion through which the position of said indicator may be observed;

attaching said container to said assembly substantially on the axis of rotation of said assembly;

causing said assembly to rotate until the movable indicator has reached a position of approximate equilibrium under the forces acting thereon;

stopping said assembly from rotating and noting the position of said indicator with respect to the axis of rotation; and adding or subtracting weight at one or more locations on said assembly as estimated from the direction and distance of the indicator from the axis of rotation.

2. A device for detecting cyclically repeated unbalanced radial force in a rotating assembly such as a vehicle wheel comprising:

a closed container viscous fluid and an immersed, movable indicator of less density than said fluid, together filling said container; said container having at least one transparent portion through which said indicator may be observed and being adapted to be mounted at the axis of rotation of said assembly whereby balanced radial forces due to rotation would tend to move said indicator to the axis of rotation the relative dimensions of said container and said indicator being so proportioned that the indicator can be displaced in any given radial direction; the viscosity of said fluid and the relative densities of said fluid and said indicator being so proportioned that no significant relative movement of the indicator with respect to the container would occur in the time required for bringing the rotating assembly to a halt and observing the position of the indicator.